US011067663B2

(12) United States Patent
Lubberhuizen

(10) Patent No.: US 11,067,663 B2
(45) Date of Patent: Jul. 20, 2021

(54) APPARATUS AND METHOD OF FLIGHT MEASUREMENT

(71) Applicant: Dialog Semiconductor B.V., s-Hertogenbosch (NL)

(72) Inventor: Wessel Lubberhuizen, Delden (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 295 days.

(21) Appl. No.: 16/222,937

(22) Filed: Dec. 17, 2018

(65) Prior Publication Data
US 2019/0204406 A1    Jul. 4, 2019

Related U.S. Application Data

(60) Provisional application No. 62/611,651, filed on Dec. 29, 2017.

(51) Int. Cl.
*G01S 5/02* (2010.01)
*H04W 4/029* (2018.01)
*G01S 5/10* (2006.01)
*G01S 11/02* (2010.01)
*H04B 7/06* (2006.01)

(52) U.S. Cl.
CPC .......... *G01S 5/0284* (2013.01); *G01S 5/0242* (2013.01); *G01S 5/10* (2013.01); *G01S 11/02* (2013.01); *H04W 4/029* (2018.02); *H04B 7/0682* (2013.01)

(58) Field of Classification Search
CPC .............................. G01S 5/0284; G01S 5/0242
See application file for complete search history.

(56) References Cited

U.S. PATENT DOCUMENTS

| 5,764,686 A * | 6/1998 | Sanderford | G01S 3/043 375/149 |
| 2007/0121679 A1* | 5/2007 | Strutt | H04J 3/0682 370/516 |
| 2010/0026576 A1* | 2/2010 | Belcea | G01S 13/76 342/387 |

(Continued)

OTHER PUBLICATIONS

"Least Squares Algorithms for Time-of-Arrival-Based Mobile Location," by K. W. Cheung et al., IEEE Transactions on Signal Processing, vol. 52, No. 4, Apr. 2004, pp. 1121-1128.

(Continued)

*Primary Examiner* — Marcus E Windrich
(74) *Attorney, Agent, or Firm* — Saile Ackerman LLC; Stephen B. Ackerman

(57) ABSTRACT

Methods and devices for distance measuring/ranging, as well as location measurements both in 2D and 3D are presented. More specifically, the methods and devices are for determining the time of arrival of a radio frequency signal. A method of determining a time of arrival of a radio frequency signal in a receiving device as received from a transmitting device includes receiving a radio frequency signal, determining a first phase. The first phase is defined as a phase of the received radio frequency signal. The method also includes obtaining a second phase. The second phase is defined as a phase of a reference radio frequency signal. The method also includes determining the time of arrival of the radio frequency signal based on comparing the first and second phases.

20 Claims, 3 Drawing Sheets

(56) References Cited

U.S. PATENT DOCUMENTS

| | | | | |
|---|---|---|---|---|
| 2012/0122485 A1* | 5/2012 | Bartlett | ................ | G01S 5/0284 455/456.1 |
| 2016/0139237 A1* | 5/2016 | Connolly | ................ | G01S 5/02 340/10.1 |
| 2016/0291123 A1* | 10/2016 | Van Puijenbroek | ......................... | H04W 64/006 |

OTHER PUBLICATIONS

"Time of Arrival Based Localization in VVIreless Sensor Networks: A Non-Linear Approach," by Ravindra. S et al., Signal & Image Processing: An International Journal (SIPIJ) vol. 6, No. 1, Feb. 2015, pp. 45-59.

* cited by examiner

APPARATUS AND METHOD OF FLIGHT MEASUREMENT

This application claims priority to Provisional application:
Prov. Ser. No. 62/611,651, filed Dec. 29, 2017, which is herein incorporated by reference in its entirety.

TECHNICAL FIELD

The present invention relates to methods and devices for distance measuring/ranging, as well as location measurements both in 2D and 3D. More specifically, the present invention relates to methods and devices for determining the time of arrival of a radio frequency signal.

BACKGROUND

The distance between two devices may be measured by the arrival time of a radio frequency (RF) signal transmitted by a device to another device. When the departure time of the RF signal from the transmitting device and the arrival time of the RF signal to the receiving device are determined, a time of flight ($\tau f$) may be obtained, which indicates the time the RF signal travelled from the transmitting device to the receiving device. If the velocity v of the RF signal is known, the distance d between the two devices can be computed as:

$$d = v * \tau f$$

Thus, if one of the devices has a known location, by using this equation, one can calculate how far the other device is from the known location. Of course, in the same way, distances can be measured to two, three or more devices all having known locations. If one measures the distances to three (or more) different known locations in this way, by using known equations, like triangulation, devices can easily calculate their own location, both in 2D and 3D spaces.

However, because the velocity of the RF signal is very high (speed of light), small offsets/mistakes in the time of flight may result in a distance calculation result that is very different from the real distance. These offsets/mistakes may be caused by radio frequency environments, space environments, hardware accuracy (frequency offsets, phase offsets, etc.) or any other avoidable or unavoidable reasons/factors.

Some other conventional methods rely on the received signal strength as an indication for distance, but this is in general not very accurate. That is because the signal strength at a receiver side not only depends on the signal strength at the transmitter side and the travelled distance but also on the RF environment encountered on the path between transmitter and receiver. For instance, in case the RF waves pass through a human body or encounter a metal object, a large part of the waves may either be absorbed or reflected, resulting in a decrease or increase of the received signal strength, which leads to a wrong conclusion about the distance. Therefore, it is very difficult to build a propagation model of RF signals that fully simulates the real environment. On the other hand, if the propagation model of RF signal is close to the real environment which will lead to a very detailed model, the computational cost of the model may be too high for the model to be used.

Prior art uses unmodulated carriers, impulses or chirp signals, and the latter two are not suitable in the 2.4 GHz band (or lower). Moreover, none of these methods allows for modulation to accompany distance measurement signals.

Prior art methods may be found in K. W, Chueng, Least Squares Algorithms for Time-of-Arrival based mobile location, IEEE transactions on signal processing, Vol 52, Nov 4, April 2004, and Ravinda S, Time of Arrival Based Localization in Wireless sensor networks: A linear approach, Signal & Image Processing: An International Journal, Vol. 4, No. 4, August 2013. In both documents, the coordinates of devices are used to determine a distance between them based on some optimization methods.

SUMMARY

The current invention aims at more efficient and/or accurate time of arrival measuring methods and devices. This time of arrival can then be used in calculations of time of flight which can be further used in calculations to establish a distance between two or more devices, and possibly locations in a 2D or 3D space, as explained above.

To that effect, the invention is defined in the annexed independent claims. Advantageous embodiments are defined in the depending claims.

The claimed system and method can be used at the same time as useful data transfer. I.e., the received useful data can be used to calculate the time of arrival of the received signals. Since no additional signals need be sent from the transmitter to the receiver, power is saved when compared to prior art methods.

Moreover, using useful data to derive the time of arrival can be used by the receiver to make a coupling between the useful data itself and the derived time of arrival, which adds to security. This is especially important when applied in the field of IoT (Internet of Things) where there is a high demand for security of data communication. For example, if a device knows the location from where certain data is transmitted or the distance to the other device which transmits the data, the device may determine whether these data are reliable/secure or not.

BRIEF DESCRIPTION OF THE DRAWINGS

The present invention will be discussed in more detail below, with reference to the attached drawings, in which.

DESCRIPTION

Figure 1:
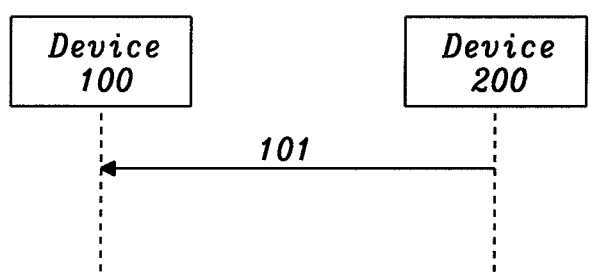
FIG. 1 shows a distance measuring process according to an embodiment of the current invention.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope of the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

For the purpose of determining the extent of protection conferred by the claims of this document, due account shall be taken of any element which is equivalent to an element specified in the claims.

BRIEF DESCRIPTION OF BEST MODE OF THE INVENTION

According to an embodiment of the current invention, when two devices are synchronized with their local timers (i.e., local clocks), a time of flight of a RF signal may be calculated by the time difference between the recorded departure time and the recorded arrival time of a RF signal sent by one of them, i.e. the transmitter, to the other one, i.e. the receiver.

FIG. 1 shows a distance measuring process according to an embodiment of the current invention when the local timers of the receiving device and the transmitting devices are synchronized.

As used herein, the term "device" is short for "electronic device", more specifically "telecommunication device". I.e., at least one of them should be a transmitter and the other one should be a receiver. Practically, all devices will be transceivers, i.e., will be arrange both as a transmitter and a receiver. Examples of such devices, as well as their most important components will be explained hereinafter with reference to FIG. 4.

In FIG. 1, device 200 is a transmitter and device 100 is a receiver. When device 200 sends a RF signal 101 to device 100 at time t1 recorded by the local timer of device 200 and device 100 receives the RF signal 101 from device 200 at time t2 recorded by the local timer of device 100, the time of flight of the RF signal 101 is t2−t1. Accordingly, the distance between device 200 and device 100 may be calculated based on t2−t1 and the velocity v of the RF signal 101, as shown in the above equation. To increase the accuracy, an average time of flight may be obtained based on multiple RF signals (either from device 200 to 100 and/or from device 100 to device 200) transmitted and received between the two devices, or based on one or multiple RF signals between multiple transmitting devices and/or multiple receiving devices at the to-be-measured two locations. In this case, the average time of flight may be used to calculate the distance between the location of device 100 and the location of device 200.

According to an embodiment of the current invention, the local timers of the devices for distance measuring are not synchronized.

Figure 2:
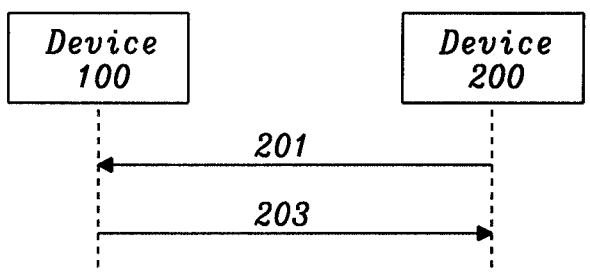
FIG. 2 shows another distance measuring process according to an embodiment of the current invention.

FIG. 2 shows a distance measuring process according to an embodiment of the current invention when the local timers of the devices are not synchronized.

In FIG. 2, at one time instance, the time according to the local timer of device 200 may be t1 and the time according to the local timer of device 100 may be t2, and t1=t2+Δt, wherein Δt is the time offset between the two local timers. Therefore, the time of flight cannot be simply calculated by the difference between the recorded departure time at the transmitting device local timer and the recorded arrival time at the receiving device local timer, because Δt is not known or at least very difficult to be accurately measured.

According to an embodiment of the current invention, the time of flight for signals between two devices can be calculated without knowing the timer difference Δt between the two devices, by using at least two RF signals which are in opposite directions. For example, as shown in FIG. 2, device 200 sends a first RF signal 201 to device 100 with a departure time t1d according to the local timer of device 200 and device 100 receives the first signal 201 from device 200 with an arrival time t1a according to the local timer of device 100. Shortly after or at the same time of device 200 transmitting the first signal 201, device 100 transmits a second RF signal 203 to device 200 with a departure time t2d according to the local timer of device 100, and device 200 receives the second signal 203 from device 100 with an arrival time of t2a according to the local timer of device 200. Assuming that, when the first signal 201 is transmitted and received, the timer difference between the local timer of device 200 and the local timer of device 100 is Δt1, and when the second signal 203 is transmitted and received, the timer difference between device 200 and device 100 is Δt2, the following equations may be satisfied:

$$t1a = t1d + t12 + \Delta t1 \text{ and}$$

$$t2a = t2d + t21 - \Delta t2,$$

wherein t12 is the time of flight of the first signal 201 and t21 is the time of flight of the second signal 203.

When the local timer differences are the same for the first and second signal, i.e., Δt1=Δt2, then the average time of flight for the first and second signals are:

$$t = (t12 + t21)/2 = (t1a - t1d + t2a - t2d)/2$$

With the above method, the local timers of devices 100 and 200 do not need to be synchronized when measuring the time of flight. Furthermore, multiple transmitting devices and/or multiple receiving devices at to-be-measured two locations may be used to measure multiple time of flight with the above method, then an average value based on all measured times of flight may be used to calculate the distance between the two locations.

When the local timers of the devices are not synchronized and the first and second signals 201 and 203 are not transmitted/received at the same time, the assumption that the timer differences Δt1 and Δt2 are substantially the same may not be valid, which may be because of frequency offset (δ) due to hardware differences between the local timers of the devices 100, 200 (e.g. local oscillators of these two timers may be different causing their output signals to be different). The timer difference Δt1 and Δt2 may also be influenced by a jitter (ε) which may be a Gaussian distributed random component with a variance that increases linearly with the time difference of transmitting/receiving the first and the second signals 201, 203. I.e., $$\Delta t2 = \Delta t1 + (t2a - t1d)*\delta + \varepsilon$$

Therefore, while measuring distance, it is desirable to eliminate or at least minimize the frequency offset (δ) and jitter (ε). The frequency offset can be compensated for when the local oscillator that is used for generating the RF carrier is derived from the same oscillator as the local clock/timer. In this case the relative clock/timer frequency offset will be equal to the relative frequency offset of the received signal. The jitter (ε) may be eliminated when the first and second signals are transmitted/received at the same moment, or at least the first and second signals should be transmitted and/or received within such a short time period that the influence of jitter (ε) can be neglected.

According to the previous embodiments of the current invention, in order to measure distance, the departure time (transmitting time) and arrival time (receiving time) shall be determined.

According to the previous embodiments of the current invention, the departure time of a signal is triggered by the local clock/timer of the transmitting device, and is hence accurately known. In practice there will be a delay in the transmitter chain between the trigger moment and the moment when the RF wave emerges from the transmitter antenna. This delay may be added to the trigger moment to calculate the departure time of a signal.

In the following example, the transmitted RF signals have some form of phase modulation. As is known to persons skilled in the art, phase modulation of an RF signal can be expressed in the form of changing values of I, Q signals. The receiver may store a number of I[n], Q[n] samples referencing the instantaneous phase of the received signal in its memory for post-processing. As will be explained, the receiver can derive the phase from such stored I[n], Q[n] samples. From the derived phase, the receiver can calculate the arrival time of the received RF signal.

Figure 3:
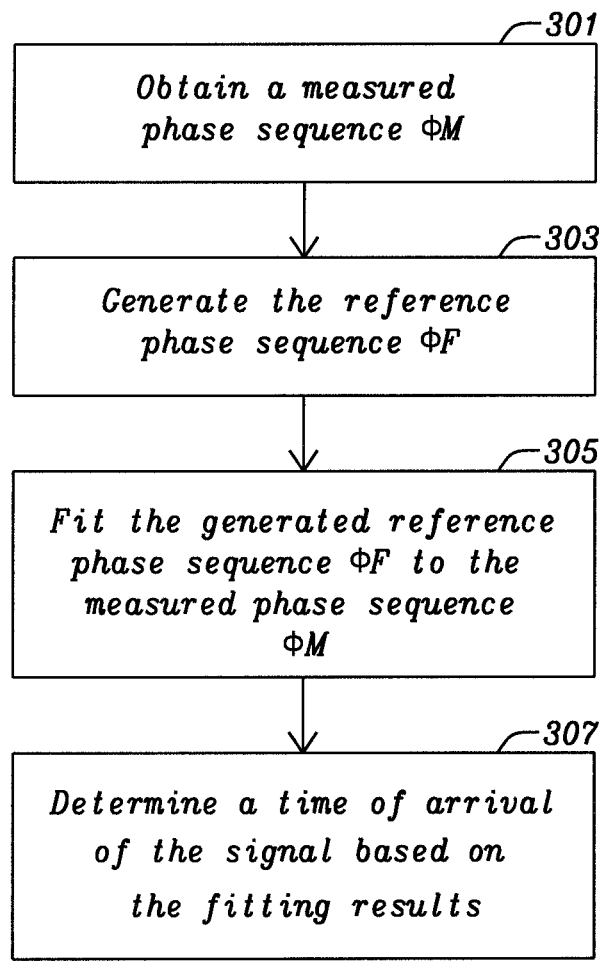
FIG. 3 shows a method of determining the time of arrival of a RF signal according to an embodiment of the current invention.

According to an embodiment of the current invention, the arrival time of a RF signal may be obtained in the following steps after receiving the RF signal, as shown in FIG. 3:

Step 301: obtain a measured phase sequence φM;

Step 303: generate a reference phase sequence φF;

Step 305: fitting the generated reference phase sequence φF to the measured phase sequence φM;

Step 307: determining a time of arrival of the signal based on the fitting results.

According to an embodiment of the current invention, some or all these steps may be performed by the receiving device, or some or all of these steps may be performed by a remote server or the transmitting device, or performed together by at least two of the receiving device, transmitting device and a remote server. Where the steps are not performed by the receiving device but by a remote server or the transmitting device, necessary information may need to be exchanged between these devices in order to perform a certain step. In the following description, it is assumed that these steps are performed by the receiving device, unless it is pointed out otherwise, which should not limit the scope of protection of the current invention. These steps will be discussed one-by-one in the following content.

Step 301: Obtain a Measured Phase Sequence φM:

In Step 1, after a receiving device receives a RF signal, a phase sequence φM of the received RF signal is obtained. The phase sequence φM is thus a measured phase sequence relative to an output signal of a local oscillator (LO) of the receiving device, which is obtained based on the actual received RF signal. The local oscillator may be a crystal oscillator, but other oscillators may be used too.

According to an embodiment of the current invention, the phase sequence φM may be directly measured from a sampled received RF signal. For example, the receiver first samples the received RF signal, then directly measures each phase shift value φM(n) for each n-th sample of the RF signal, wherein the phase shift values are relative to the phase of the local oscillator. Eventually, the phase sequence φM for the whole signal may be obtained.

According to an embodiment of the current invention, the phase sequence φM may, alternatively, be obtained by the receiver in the following way. First, the receiver obtains the received RF signal as a sequence of complex samples Zm(n), wherein Zm(n)=I(n)+j*Q(n), wherein n indicates n-th sample in the sequence of samples. The real component I(n) is the in-phase component, and the imaginary component Q(n) is the quadrature component. Then, assuming that the received signal is sufficiently oversampled and that the noise levels are low, the phase sequence φM may be obtained without error by unwrapping Zm, i.e.:

$$\phi M = \text{unwrap}(\arg(Zm)),$$

wherein arg(Zm) applies argument function to each of the complex samples in Zm(n) to obtain a sequence of phase shift values. The unwrap function corrects the phase angles in the vector arg(Zm) by adding multiples of ±2π when absolute jumps between consecutive elements of arg(Zm) are greater than or equal to the default jump tolerance of π radians. For example, the unwrap function may correct the phase sequence arg(Zm) to a smooth form and hence make the phase usable in further processing. The unwrap function is also widely used in mathematical software, e.g., in Matlab.

In general, besides the transmitted RF signal, the shape of the phase sequence φM may also be impacted by environment/measurement noise, phase offset between the local oscillators of the transmitting device and receiving device, frequency offset between local oscillators of the transmitting device and receiving device, the modulation index, and the propagation delay.

Step 303: Generate the Reference Phase Sequence φF:

The local time of arrival is determined by fitting a reference phase sequence φF to the phase sequence φM, which reference phase sequence φF is derived from an ideal reference phase sequence φR which represents the phase sequence that would have been obtained under ideal transmission conditions: e.g. reflecting at least one of no measurement noise, no starting phase offset, no frequency offset, no timing offset and no modulation index offset.

According to an embodiment of the present invention, the reference phase sequence φF may be a mathematical prediction of the phase sequence of the received RF signal. The reference phase sequence φF may be based on a model when considering at least one of starting phase offset, frequency offset, timing offset and modulation index, for example according to the following equation:

$$\phi F(n)=\beta 1+\beta 2*n+\beta 3*\phi R(n+s)+\beta 4*(\phi R(n+s+1)-\phi R(n+s)), \quad [\text{eq. 1}]$$

wherein
n indicates the n-th sample,
β1 is the starting phase offset (i.e., the phase offset between the local oscillators of the transmitting device and the receiving device at the time of measurement),
β2 is the frequency offset between the local oscillators of the transmitting device and the receiving device,
β3 is the relative modulation index of the RF signal,
β4 is a fractional time offset,
s is a sample time offset, and
φR is the ideal reference phase sequence.

The ideal reference phase sequence φR may either be precomputed by the receiving device (or by a remote server or the transmitting device) in case the data contained in the RF signal is predetermined/known already before the RF signal is received. Alternatively, the ideal reference phase sequence φR may be generated on the fly by the receiving device or a remote server after receiving the RF signal, by first demodulating the RF signal to obtain the contained data and then re-modulating the obtained, demodulated data. In case the ideal reference phase sequence φR is generated on the fly, the RF signal shall be received without any missing or error data when compared with the transmitted data.

According to an embodiment of the current invention, the parameter s is the sample time offset, which indicates how many samples have been shifted between the transmitted and received RF signals, and the parameter β4 is the fractional time offset within a sample time between the transmitted and received RF signals. Therefore, s+β4*ΔT indicates the time of arrival of the received RF signal, wherein ΔT is the time period between two adjacent samples and may be called one sample time.

According to an embodiment of the current invention, based on [eq. 1], the reference phase sequence φF may be expressed as a matrix equation as follows:

$$\phi F = X*\beta, \quad [\text{eq. 2}]$$

wherein β is a 4*1 vector containing the parameters β1, β2, β3 and β4 (i.e., β=[β1,β2,β3,β4]$^T$) and X is a N*4 matrix as follows:

$$X = \begin{bmatrix} 1 & 0 & \phi_R[s+0] & \phi_R[s+1]-\phi_R[s] \\ 1 & 1 & \phi_R[s+1] & \phi_R[s+2]-\phi_R[s+1] \\ \cdots & \cdots & \cdots & \cdots \\ 1 & N-1 & \phi_R[s+N-1] & \phi_R[s+N]-\phi_R[s+N-1] \end{bmatrix} \quad [\text{eq. 3}]$$

wherein N is the total number of the samples.

According to an embodiment, of the current invention, the mathematical model for φF in [eq. 1] may be in a different form. For example, the frequency offset part β2*n may be expanded even further with more parameters, e.g., the frequency offset part β2*n may be replaced by another frequency offset part: β21*n+β22*n$^2$+β23*n$^3$+ . . . +β2m*n$^m$ and m=1, 2, . . . as a positive integer. Similarly the relative modulation index part β3* φR(n+s) and/or the fractional time offset part β4*(φR(n+s+1)−φR(n+s)) may also be expanded in a similar way. Hence, the forms of [eq. 2] and [eq. 3] may be changed accordingly.

According to an embodiment of the current invention, some of the parameters β31, β2, β3, and β4 in [eq. 1] may be variables or fixed values. For example, some of β1, β2, β3, and β4 may be omitted (i.e., equal to 0) or be given predetermined values (i.e., in the model of [eq. 1], the values of the parameters may be measured in real life or be assigned a fictional value). For example, in some wireless communication protocols, the modulation index is fixed by design, in this case β3 may be a determined/fixed value and not a variable. Or in case that the local oscillators of the transmitting and receiving devices are identical (e.g., sharing the same local oscillator, or using the signal generated by the same local oscillator, or the two local oscillators are manufactured in a way that they have almost the same performance), the phase offset parameter β1 and/or the frequency offset parameter β2 may be assigned the value 0, since there is no phase offset or frequency offset. As a result, the forms of [eq. 2] and [eq. 3] may be changed accordingly.

Therefore, the exact form of [eq. 1] does not limit the scope of protection of the current invention.

Step 305: Fitting the Generated Reference Phase Sequence φF to the Measured Phase Sequence φM:

Based on the above mathematical models for the reference phase sequence φF and a given sample time offset s (i.e. s may be assigned a test value or an estimated value for the sample time offset), a fitting procedure can be formulated as a linear least squares problem, with the sum of squared residuals:

$$S(\beta)=(\phi M-X*\beta)^{T*}(\phi M-X*\beta). \quad [\text{eq. 4}]$$

The sum of squared residuals S(β) will be minimized to S' when β=β', where $$\beta'=A*X^T*\phi M, \text{ and}$$

$$A=(X^T*X)^{-1},$$

wherein A can be calculated directly since the ideal reference phase sequence φR and sample time offset s are already given.

Accordingly to an embodiment of the current invention, the optimization problem (i.e., the fitting procedure) may be formulated in other forms, for example, with a weighted least square problem. Thus, the specific optimization problem form in [eq. 4] shall not limit the scope of protection of this invention.

According to an embodiment of the current invention, when some of the parameters in β is/are omitted or given fixed values, the size of matrix A may change accordingly.

For example, when the relative modulation index β3 is a fixed value because a specific wireless communication protocol is used to transmit the RF signal/signals, matrix A becomes a 3*3 matrix.

Step 307: Determining a Time of Arrival of the Signal Based on the Fitting Results.

According to an embodiment of the current invention, the fitting procedure may be repeated for a finite range with different s values between an interval [ss, se]. The interval [ss, se] in which the value of s may be, may be an estimated interval for the arrival time of the RF signal, or may be a measured interval for the arrival time as obtained with other methods (e.g., less accurate methods), or may be a fictional interval determined in other ways. Or the starting value ss for the sample time offset s may be obtained from a synchronization unit that flags the detection of a particular synchronization sequence in the demodulated symbol sequence.

With different values of sample time offset s (e.g., as a vector s"=(s1, s2, . . . , si, . . . , sk) with k different s values, wherein sk=se and s1=ss), a sequence of β' may be obtained (e.g., as a vector β"=(β1', β2', . . . , βi', . . . , βk'), where k is the number of the s values) and a sequence of minimized S' may also be obtained (e.g., as a vector S"=(S1', S2', . . . , Si', . . . , Sk')), wherein βi' comprises the values for β1, β2, β3 and β4 for the minimized S(β) value Si' when s=si.

According to an embodiment of the current invention, when the vectors S" and β" are obtained based on the vector of s", a minimal value in S" may be determined. Then the arrival time of the RF signal may be determined as s+β4*ΔT, wherein the values of s and β4 correspond to the minimal value of S".

According to an embodiment of the current invention, the above method of determining the arrival time of a signal or signals, may be used in the distance measuring methods as shown in FIG. 1 or 2 between two synchronized or unsynchronized devices.

According to an embodiment of the current invention, a RF signal containing certain data may be preselected to avoid the matrix $X^T*X$ to be singular or close to singular. That is because, when $X^T*X$ is singular, then $A^{-1}$ is undefined, and there is no unique solution for β'. Another method to avoid the matrix $X^T*X$ from being singular, is to give a specific value to the modulation index to reduce the parameters in β. In other cases when $X^T*X$ is close to singular, $A^{-1}$ may become very large (i.e., larger than a threshold value), then the results become very susceptible to noise. Therefore, it is desirable to select a RF signal that does not result in the matrix $X^T*X$ to be singular or close to singular.

According to an embodiment of the current invention, in step 305 and step 307 of the above method, a bounded interval [0,1] or [0,1) for fractional time offset β4 may be added in the optimization problem, to avoid results that have a fractional time offset β4 larger than 1. However, this may not be necessary, because in step 307 multiple s values will be tried and it is less likely that all the β4 results are larger than 1 and the results when β4 is larger than 1 will not be chosen.

The fact that modulated carriers are used is advantageous for security reasons. I.e., the system and method can be used at the same time as useful data transfer. This adds security and/or power benefits to prior art solutions. For example, when a car key sends an unlock signal to a car, both the data contained in the signal and the distance between the car key and the car will be used to determine whether to unlock the car. E.g., unlock signals received from a device at a greater distance than a certain threshold distance may be not accepted as being not trustworthy. The secure method in the example may be used in other Internet of Things (IoT) applications.

It is observed that Step 1 is described as derivation of the phase from available I[n] and Q[n] samples. However, this can be generalized, since it is also possible to directly detect the phase or to reconstruct the phase from a received frequency. This depends on what is available in the receiver's hardware.

The method is described for a system in discrete time with a constant sampling frequency. However, thanks to the sparsity of the received signal in the frequency domain, the method lends itself to an implementation using compressive sensing.

Figure 4:
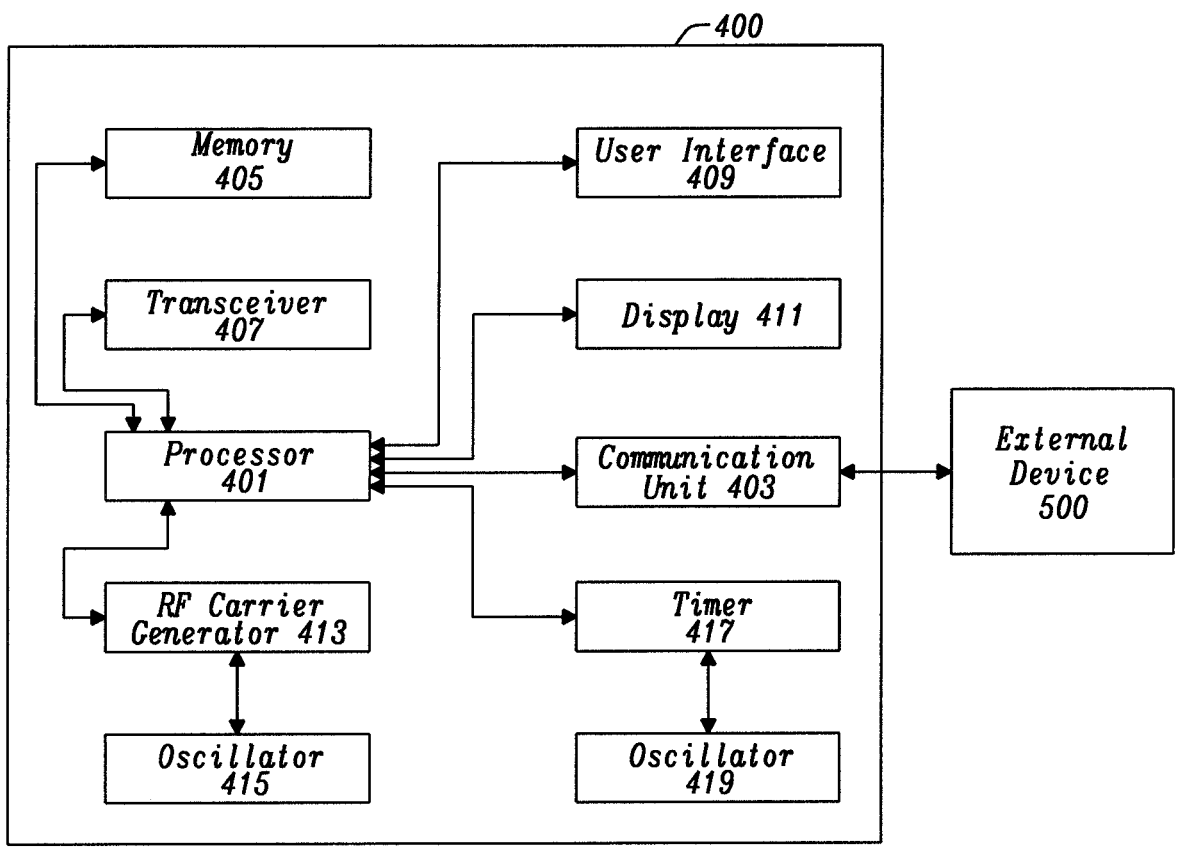
FIG. 4 shows an electronic device according to an embodiment of the current invention.

FIG. 4 shows a device 400, more specifically an electronic device 400, to perform the distance measuring methods/processes according to the embodiments of the current invention.

The device 400 comprises a transceiver 407 to transmit and/or receive RF signals. There may be more than one transceivers (not shown in the figure) in the device, and these transceivers may transmit and/or receive the same and/or different RF signals at the same time or different times.

The device 400 may comprise another communication unit 403, wherein the communication unit 403 is used to communicated with an external device 500. The external device 500 may be a remote server or another device similar as device 400. The communication unit 403 may be the transceiver 407 or another communication unit, for example, an Ethernet communication unit, an optical communication unit, an Infrared communication unit or any other communication unit that may provide data/information exchanges between two electronic devices.

The device 400 may comprise a processor 401, which is configured to control the communication units 407 and 403. The controller 401 may be a CPU (Central Processor Unit) or GPU (Graphic Processor Unit) or any other type of processors.

The device 400 may be an electronic device in the form of a desktop computer, laptop computer, mobile phone, GPS (Global Positioning System) device, tablet, smart electronic devices (e.g., smart TV, smart lamp, smart fridge, smart meters, etc.), electronic measuring devices, Internet of Things (IoT) devices, or any other electronic devices comprising a processor and transceiver.

The device 400 may comprise user interface 409 and display 411 that are connected to the processor 401 for input/output functions, which may be input/out components in any form.

The device 400 may also comprises an oscillator 415 for providing input to a RF carrier generator 413, and/or an oscillator 419 for providing input to a local timer 417 (i.e., local clock). The two oscillators 415 and 419 may be the same oscillator.

The device 400 may comprise other components that are not shown in FIG. 4, for example, more input unit(s), more output unit(s), more controller(s)/processors(s), different types of memory, component(s) for internal communications, accessories, sensor(s), and/or any other possible hardware/software components.

The device 400 may comprise a Memory 405 to store programs/instructions/software for separately or coordinately running the other components in device 400, e.g., communication unit 403, transceiver 407, user interface 409, display 411, RF carrier generator 413, timer 417 and oscillators 415 and 419.

According to an embodiment of the current invention, the device 400 may be used as device 100 and/or 200 for distance/location measuring methods as shown in FIG. 1 and/or FIG. 2, wherein the transceiver 407 may be controlled by the processor 401 to transmit and/or receive RF signals. The computing tasks discussed in this description for synchronized and/or unsynchronized devices in distance/location measuring may be performed by the processor 401, or the computing tasks may be performed by the external device 500 (with necessary information exchange between the devices), which may be a remote server. The memory 405 may be configured to store and run the computation program/instructions according the distance/location and/or time of arrival measuring methods, and store the initial values, intermediate results and final results of the methods.

According to an embodiment of the current invention, the processor 401 may be configured to perform all or parts of the steps for determining arrival time of a RF signal as shown in FIG. 3. For example, when the device 400 is the device receiving the RF signal, the processor 401 may be configured to perform at least one of the steps shown in FIG. 3, and/or the processor 401 may control the transceiver 403 to exchange information with the external device 500 wherein the external device 500 performs the remaining steps or the same steps.

The embodiments according to the current invention are advantageous because while measuring distance, useful data may also be included in the RF signal for distance measuring, which may improve data efficiency, security or performing authentication in a RF application.

The embodiments according to the current invention are further advantageous because modulated RF signals may be used for distance measuring. Modulated RF signals are suitable for high frequency communications, for example 2.4 GHz communication. Therefore, the commonly used communication protocols, e.g., wifi, Bluetooth, zigbee and others, may be directly used in the distance measuring methods according to the current invention.

What is claimed is:

1. A method of determining a time of arrival of a radio frequency signal in a receiving device as received from a transmitting device, the method comprising:
receiving a radio frequency signal, said radio frequency signal being a phase modulated radio frequency signal as a sequence of complex samples $Zm(n)=I(n)+j*Q(n)$, wherein n indicates n-th sample in the sequence of samples,
determining a first phase, said first phase being defined as a phase of said received radio frequency signal, by obtaining a measured phase sequence $\phi M$ in the radio frequency signal relative to an output signal of a local oscillator of the receiving device, said measured phase sequence $\phi M$ being obtained by unwrapping said sequence of complex samples: $\phi M = unwrap(arg(Zm))$;
obtaining a second phase, said second phase being defined as a phase of a reference radio frequency signal, by obtaining a reference phase sequence $\phi F$;
fitting the reference phase sequence $\phi F$ to the measured phase sequence $\phi M$;
determining the time of arrival of the radio frequency signal based on said fitting.

2. The method according to claim 1, wherein the method comprises:
obtaining a plurality of samples by sampling the received radio frequency signal, and
directly measuring each phase shift value for each sample relative to said output of said local oscillator such as to obtain said measured phase sequence $\phi M$.

3. The method according to claim 1, wherein said fitting the measured phase sequence $\phi M$ to the reference phase sequence $\phi F$, includes solving one or more linear least squares problems.

4. The method according to claim 1, wherein said fitting the measured phase sequence $\phi M$ to the reference phase sequence $\phi F$, includes solving one or more weighted linear least squares problems.

5. The method according to claim 1, wherein the radio frequency signal is a predetermined signal.

6. The method according to claim 1, wherein the method further comprises calculating the reference phase sequence $\phi F$ based on an ideal reference phase sequence $\phi R$, said ideal reference phase sequence $\phi R$ representing a phase sequence that would have been obtained under ideal transmission conditions.

7. The method according to claim 6, wherein the method further comprises generating the ideal reference phase sequence $\phi R$ based on demodulated information in the received radio frequency signal.

8. The method according to claim 6, wherein the ideal reference phase sequence $\phi R$ depends on a sample time offset s.

9. The method according to claim 1, wherein the method further comprises calculating the reference phase sequence $\phi F$ independence on at least one of starting phase offset, frequency offset, timing offset and modulation index.

10. The method according claim 9, wherein the method further comprises calculating the reference phase sequence $\phi F$ in accordance with the following equation:

$$\phi F(n)\beta 1+\beta 2*n+\beta 3*\phi R(n+s)+\beta 4*(\phi R(n+s+1)-\phi R(n+s)),$$

wherein
n indicates an n-th sample,
$\beta 1$ is a starting phase offset,
$\beta 2$ is a frequency offset between a local oscillator of said receiving device and said transmitting device,
$\beta 3$ is a relative modulation index of the radio frequency signal,
$\beta 4$ is a fractional time offset,
s is a sample time offset, and
$\phi R$ is said ideal reference phase sequence.

11. The method according to claim 1 wherein said radio frequency signal contains useful data.

12. A method of determining time of flight of a radio frequency signal between a first device and a second device, local clocks of the devices being synchronized, the method comprising:
sending a radio frequency signal from a first device to a second device,
determining a time of departure is of the radio frequency signal based on the synchronized local clock of the first device,
determining a time of arrival tr of the radio frequency signal by the second device with the method of claim 1 based on the synchronized local clock of the second device, wherein said second device is said receiving device;
calculating time of flight of the radio frequency signal by calculating tr−ts.

13. The method according to claim 12, wherein the method comprises:
calculating a distance between the first and second devices by multiplying the time of flight with a velocity of said radio frequency signal.

14. A method of determining average time of flight of radio frequency signals between a first device and a second device, the method comprising:
sending a first radio frequency signal from the first device to the second device,
determining a first time of departure $t1d$ of the first radio frequency signal from the first device based on a local clock of the first device,
determining a first time of arrival $t1a$ of the first radio frequency signal at the second device with the method of claim 1 based on a local clock of the second device, wherein said second device is said receiving device;
sending a second radio frequency signal from the second device to the first device,
determining a second time of departure $t2d$ of the second radio frequency signal from the second device based on the local clock of the second device,
determining a second time of arrival $t2a$ of the second radio frequency signal at the first device with the method of claim 1 based on the local clock of the first device, wherein said first device is said receiving device;
calculating an average time of flight of the radio frequency signals by calculating $(t1a-t1d+t2a-t2d)/2$.

15. The method according to claim 14, wherein the method comprises:
calculating a distance between the first and second devices by multiplying the time of flight with a velocity of said radio frequency signal.

16. A method of measuring a distance between a first device and a second device,
when the local clocks of the two device are synchronized, determining flight time as the determined time of flight of a radio frequency signal between the two devices with the method in claim 12,
calculating the distance between the two devices by multiplying the flight time with the velocity of a radio frequency signal,
preferably, multiple flight times are determined according to the method in claim 12, and the average flight time is used to calculate the distance between the two devices.

17. A device with a processor and a transceiver configured to implement the method according to claim 1.

18. A first device and a second device, each with processor and a transceiver, configured to together implement the method according to claim 12.

19. A method of measuring a distance between a first device and a second device,
when the local clocks of the two devices are not synchronized, determining flight time as the determined average time of flight of radio frequency signals between the two devices with the method in claim 14,
calculating the distance between the two devices by multiplying the flight time with the velocity of a radio frequency signal,
preferably, multiple flight times are determined according to the method in claim 14, and the average flight time is used to calculate the distance between the two devices.

20. A first device and a second device, each with processor and a transceiver, configured to together implement the method according to claim 14.

* * * * *